April 18, 1967
J. W. PRUD'HOMME ET AL
3,314,657
HYDROPNEUMATIC CABLE TENSIONER
Filed Aug. 23, 1965
4 Sheets-Sheet 3
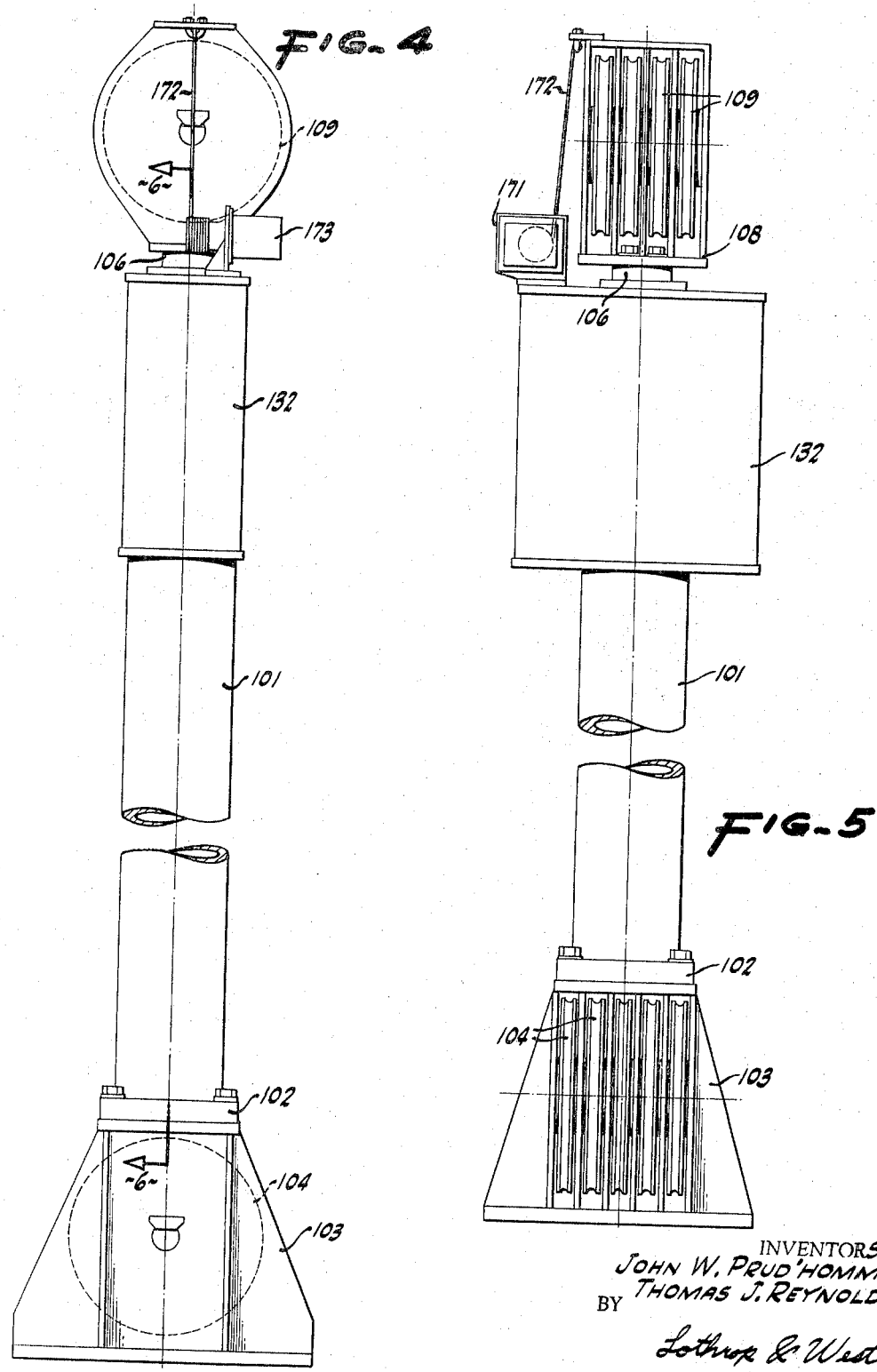
INVENTORS
JOHN W. PRUD'HOMME
THOMAS J. REYNOLDS
BY
*Lothrop & West*
ATTORNEYS

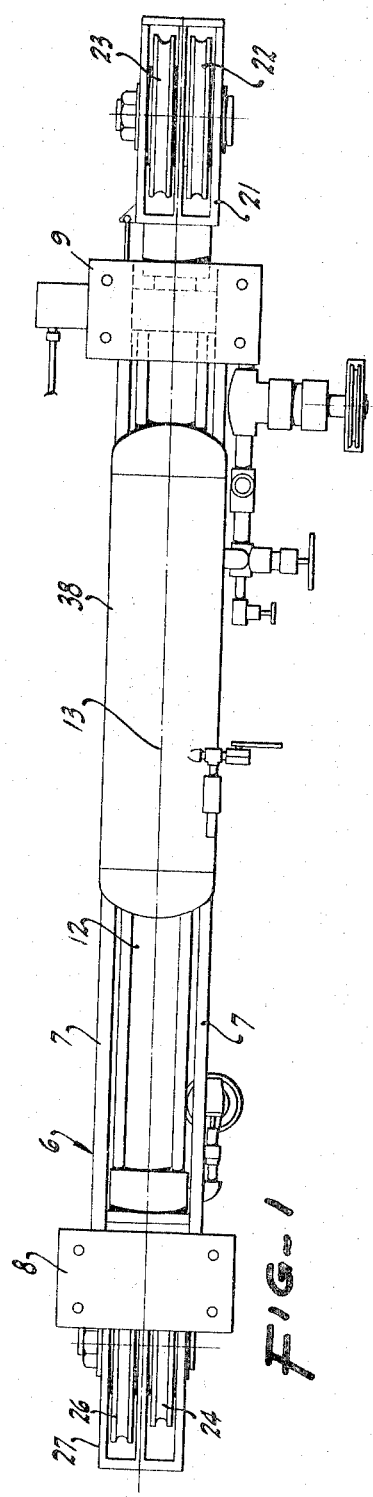
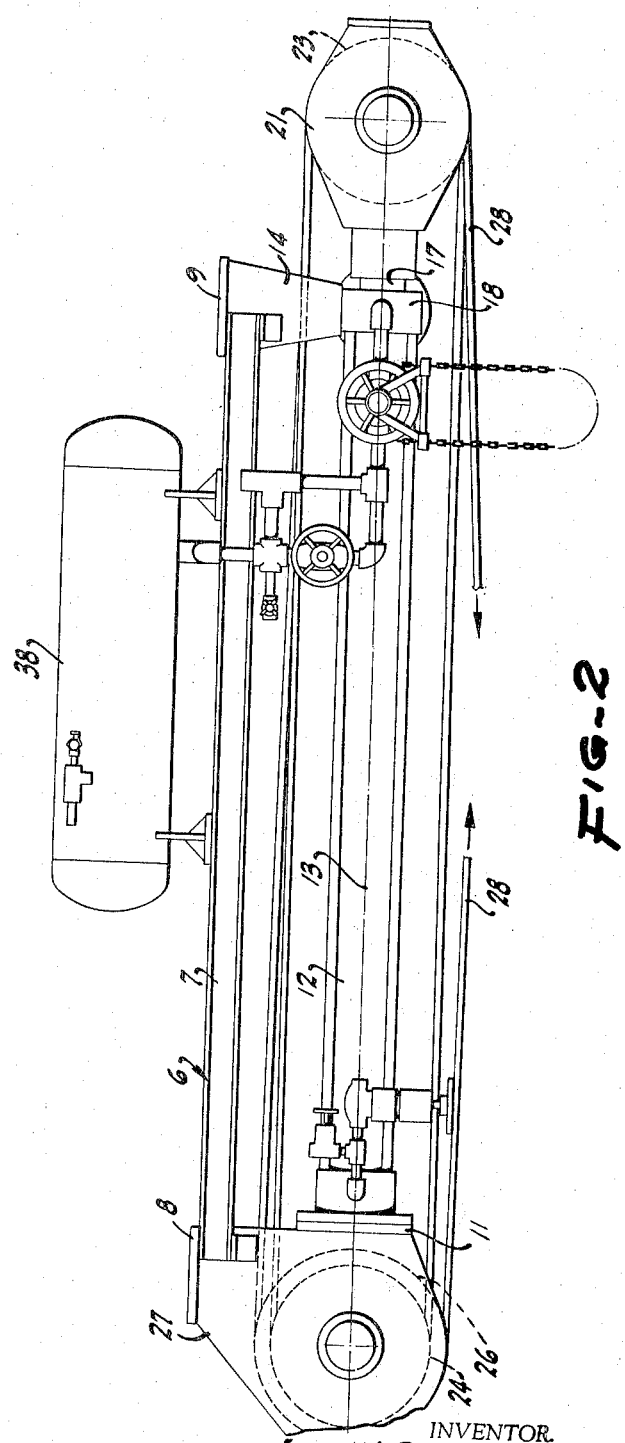

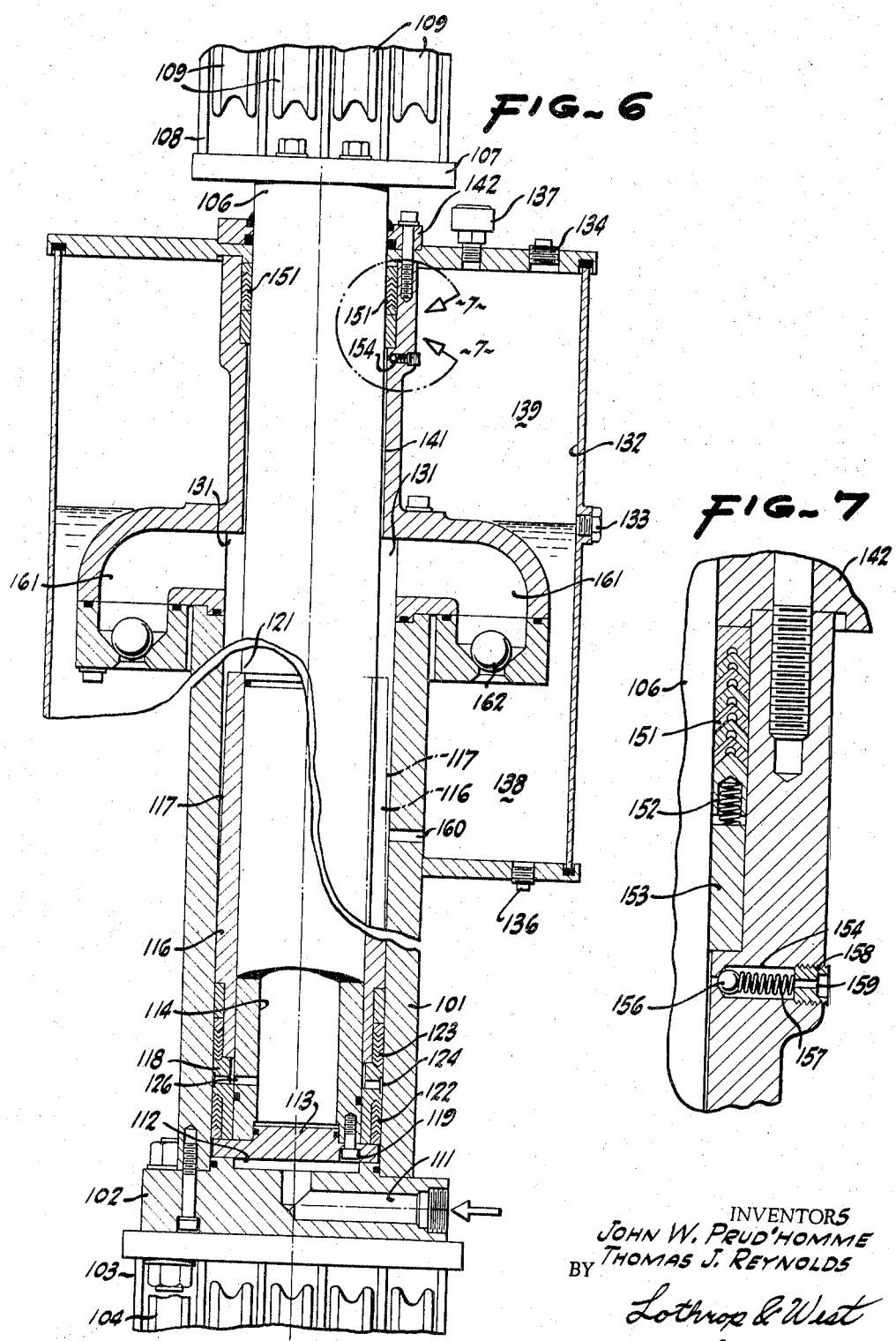

3,314,657
HYDROPNEUMATIC CABLE TENSIONER
John W. Prud'homme, Kensington, Calif., and Thomas J. Reynolds, Sedro Woolley, Wash., assignors to The Rucker Company, a corporation
Filed Aug. 23, 1965, Ser. No. 481,794
4 Claims. (Cl. 254—189)

Our invention relates to means useful in connection with cable or wire rope lines for maintaining a predetermined tension in the cable and for ensuring that in the event of failure of the cable, the resulting difficulty is not damaging to the tensioner or its immediate surroundings.

In many cable lines, particularly those handling loads subjected to varying forces, it is desirable to provide a tensioning mechanism in the nature of a take-up structure so that the force existing in the cable at any time does not vary beyond predetermined limits. It is preferred to utilize pneumatic pressure for the tensioning device, but this introduces a difficulty if the cable fails or parts. In that event, the force due to the suddenly expanding pneumatic fluid can cause considerable damage and can be quite dangerous.

It is therefore an object of our invention to provide a hydropneumatic cable tensioner effective to maintain the tension in a cable within predetermined limits.

Another object of the invention is to provide a hydropneumatic cable tensioner in which failure of the cable does not produce disruptive or dangerous effects, but produces only a controlled response by the tensioner.

Another object of the invention is to provide a hydropneumatic cable tensioner which can easily and readily be installed in a number of different environments.

A still further object of the invention is to provide a hydropneumatic cable tensioner which can operate for protracted periods without substantial supervision and without deterioration in its operation.

Another object of the invention is in general to provide an improved hydropneumatic cable tensioner.

Other objects together with the foregoing are attained in the embodiments of the invention described in the accompanying description and illustrated in the accompanying drawings, in which:

FIGURE 1 is a plan of a hydropneumatic cable tensioner as it has been particularly embodied for use in a shipboard installation;

FIGURE 2 is a side elevation of the structure illustrated in FIGURE 1;

FIGURE 4 is a side elevation of a modified form of hydropneumatic cable tensioner in accordance with the invention;

FIGURE 5 is a plan of the modified form of hydropneumatic cable tensioner shown in FIGURE 4;

FIGURE 6 is a cross section on a longitudinal median plane through the structure shown in FIGURE 4, the plane of section being indicated by the line 6—6 of FIGURE 4, the scale being enlarged and portions of the structure being removed to reduce the figure size; and FIGURE 7 is an enlarged detail of the portion of the structure within the line 7—7 of FIGURE 6.

Figure 3:
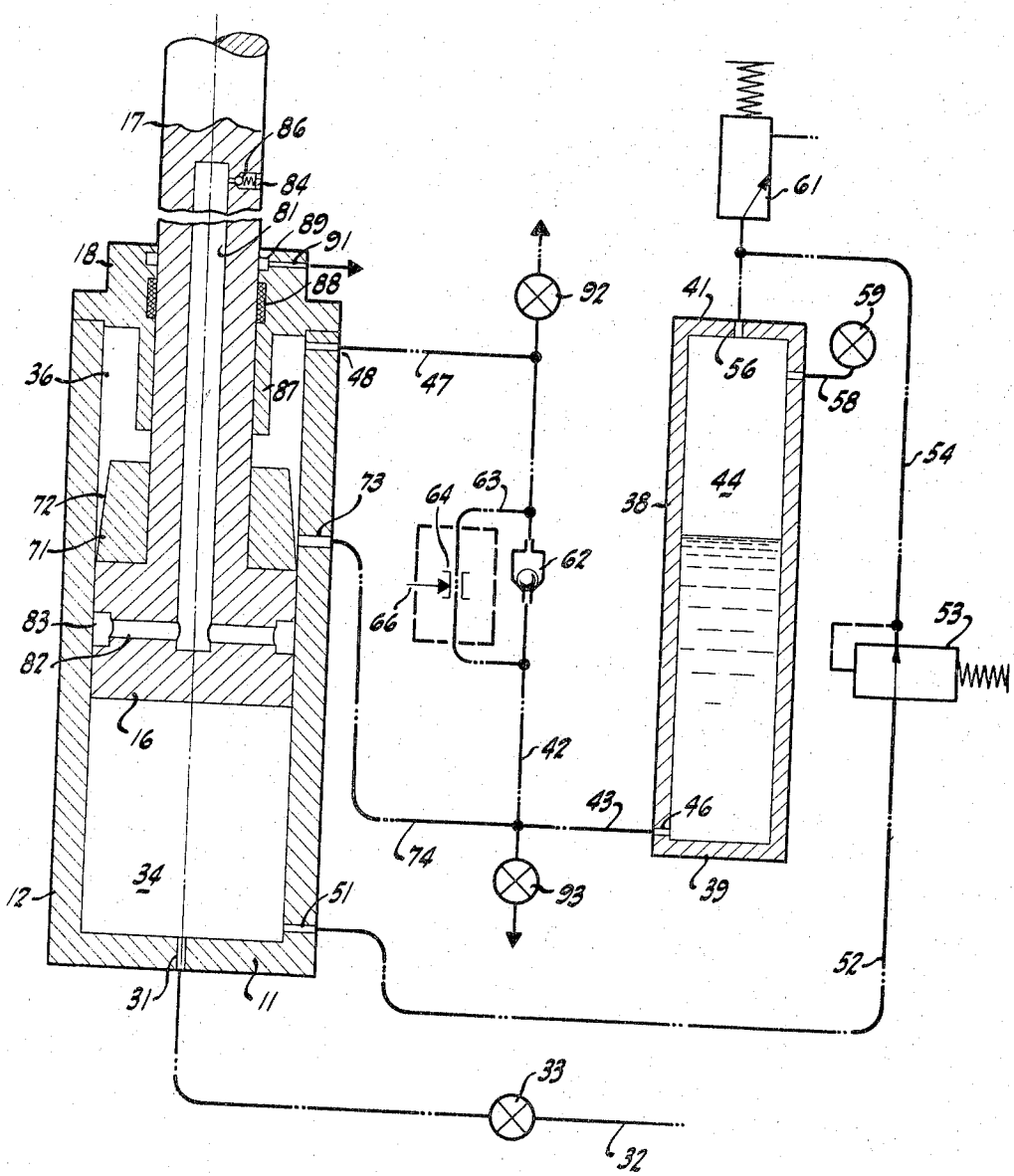
FIGURE 3 is a diagram showing a typical form of hydropneumatic cable tensioner pursuant to the invention.

The hydropneumatic cable tensioner pursuant to our invention has successfully been embodied in the various forms illustrated herein.

In the first form as shown in FIGURES 1 and 2 particularly, the installation is primarily designed for use on shipboard and includes a base 6 constituting a frame made up of channels 7 and like structural members including pads 8 and 9 for attachment of the frame to adjacent supporting members. The base is elongated and at one end is provided with a cross plate 11 forming the closed base of an elongated circular cylinder 12 having an axis 13 substantially parallel with the frame members 7. The cylinder extends to a bracket 14 included in and located at the other end of the frame or base 6.

Disposed within the cylinder 12 as particularly shown in FIGURE 3 is a piston 16 connected to one end of a piston rod 17 extending through a head 18 closing the other end of the cylinder and accommodating the piston rod 17 for reciprocatory motion. The piston rod 17 at its exterior end carries a sheave block 21 provided with a pair of pulleys 22 and 23 arranged to be reaved in conjunction with a comparable pair of pulleys 24 and 26 mounted in a sheave block 27 secured to the cross plate 11 forming part of the frame 6 and closing the end of the cylinder. A wire rope or cable 28 is reaved around the pulleys 22, 23, 24 and 26 and is connected to any suitable terminals. The number of pulleys may be varied to suit the required amount of cable take-up. For example, the cable 28 at one end is joined to a winch or hoist drum (not shown), whereas at the other end the cable is connected to a load (not shown). If the mechanism described is on shipboard and the load is on a dock or on a lighter or is suspended from the ship; for example, offshore drilling equipment, because of the motion between the two points there may be substantial variation in the load on the cable 28. It is the function of the tensioner mechanism to maintain the cable tension within predetermined limits. This is accomplished by having the piston 16, the piston rod 17 and the sheave block 21 reciprocate with respect to the cylinder 12 and the sheave block 27 in amounts to maintain the cable tension as desired or substantially so.

In order to accomplish this end, the cylinder 12 at its base end is provided with a port 31 for the passage of air under pressure. A conduit 32 leads from a suitable air supply utilizing storage vessels of specified volume to provide the desired narrow range of pressures; for example, a supply of air under pressure of 2000 lbs. p.s.i., and is provided with a manually operable shut-off valve 33. Air in the chamber 34 or air volume within the cylinder 12 beneath the piston 16 tends to expel the piston rod 17 and by moving the sheave 21 outwardly to impose a tension on the cable 28. Since the air within the volume 34 is under a set pressure or fluctuates within a narrow range of pressures, variations in cable tension cause movement of the piston 16 to and fro within the cylinder, thus maintaining a corresponding and desired cable tension.

The mechanism as so far described is effective to maintain cable tension, but there may be difficulty if the load should suddenly be lost from the cable or should the cable 28 itself fail. There is then nothing to resist the pressure of the expanding air beneath the piston 16. The piston then may advance violently against the head 18 and can even cause structural failure of the cylinder mechanism. If the piston rod 17 and its accompanying mechanism are expelled from the cylinder, serious injury can be caused.

To avoid this possibility, we provide above the piston 16 and between the piston and the head 18 and oil volume 36 or chamber defined in part by the cylinder walls, in part by the piston itself, and in part by the cylinder head. To maintain a supply of oil within the chamber 36 varying in volume inversely with the variation in volume of the chamber 34 and also because the total volume of the chamber 36 changes a large amount, there is provided an oil reservoir 38. This is a substantially closed chamber, conveniently of circular cylindrical form, having heads 39 and 41 thereon. Communication between the reservoir and the cylinder is provided by a connecting means including a conduit 42 having one portion 43 opening into the interior 44 of the rservoir 38 through a port 46. The connecting conduit 42 has another portion 47 opening through a first port 48 to the interior oil chamber 36 within the cylinder 12. Except for additional control mechanism, there is a free flow between the reservoir chamber 44 and the cylinder chamber 36. In order to ensure that the oil traverses lines such as the connecting means 42 with a reasonable velocity, it is preferred to maintain some pressure upon the oil. For that reason, air is taken from the chamber 34 through an opening 51 and is carried by a pipe 52 through an air regulator 53. The air regulator reduces the pressure of the air from the chamber 34, which approximates 2000 lbs. p.s.i., to a much lower value; for example, 50 lbs. p.s.i. A duct 54 extends from the regulator 53 to an opening 56 in the upper end of the reservoir 38. Thus the reservoir 38 in the upper portion of the chamber 44 contains a volume of air under approximately 50 lbs. p.s.i. pressure pressing on a supply of oil in the lower portion of the reservoir.

The total quantity of oil in the circuit does not vary except due to leakage. Consequently, an oil make-up is provided. The reservoir 38 is supplied with an oil filler pipe 58 having a filling valve 59. The quantity of oil within the reservoir can be maintained at a desired amount.

The regulator 53 is effective to maintain the reduced pressure of the incoming air supply, but has no function of releasing air from the reservoir. Consequently, an air relief valve 61 is connected to the duct 54. This can be set for any desired pressure; for example, 100 lbs. p.s.i. Even though there should be a large amount of oil in the reservoir 38 and even though the oil influx is quite rapid, the total pressure within the reservoir and in the oil circuit cannot exceed the value set by the air relief valve.

In accordance with the invention, it is preferred that the travel of the piston 16 in the cylinder be regulated particularly during that portion of the piston stroke when the piston travels toward and adjacent the head 18. For that reason, the connecting means 42 is provided with flow controlling devices. At a convenient point, there is installed in the connection 42 a check valve 62 arranged to open in the direction of flow of oil toward the chamber 36 and to afford substantially no restriction to flow in that direction. The check valve 62 seats in the oposite flow direction and completely checks flow through the check valve from the chamber 36 to the reservoir 38.

Extending around or shunting the check valve 62 is a bypass conduit 63 joined to the connecting means 42 on opposite sides of the check valve 62. The conduit 63 includes a throttling valve 64 having a manually adjustable valve member 66 which can be set to afford any desired amount of opening through the conduit 63. Thus flow in both directions is controlled. That is, when flow is from the reservoir toward the cylinder, the oil has two paths to follow, one through the freely open or non-restricting check valve 62 and the other through whatever adjusted orifice or opening is available in the valve 64. For reverse flow, the check valve 62 closes and checks any flow therethrough, but there remains a flow path through the shunt conduit 63 as regulated by the position of the valve 66.

With this arrangement, when the piston 16 recedes from the head 18 and induces flow of oil from the reservoir to the cylinder, there is a substantially free and unrestricted flow into the cylinder. On the other hand, when the piston 16 moves toward the head 18 and expels oil from the cylinder, the rate of expulsion of the oil depends entirely on the opening available through the valve 64. In this way, the outflow of oil can be so throttled that the piston 16 can move toward the head 18 only at a controlled rate. This is so despite the fact that there may be no restraining load at all on the piston rod 17 and the air pressure within the chamber 34 may be a maximum.

An optional or additional flow control means is also shown in FIGURE 3. The piston 16 either integrally or by a separate body 71 is provided with an exterior characterized surface 72 preferably in the form of a frustum of a cone or a portion of a paraboloid of revolution. The characterized surface 72 is not extensive enough to have its path of movement traverse the first port 48, but the characterized surface 72 does traverse a second port 73 formed in the wall of the cylinder 12 at a point near the end of the outstroke of the piston 16. The port 73 is joined by a pipe 74 to the reservoir 38 through the portion 43 of the connector 42. The optional flow control means is also embodied in FIGURE 6 and is shown where used with an integral reservoir 132 which may be pressurized or vented through 137.

With this arrangement, when the piston travels outwardly, all flow is through both the first port 48 and the second port 73, the flow through the first port being regulated by the valve 64, but the flow through the second port 73 being at first unregulated. When the piston has travelled far enough so that the characterized surface 72 begins to traverse the second port 73, the increasing diameter of the surface 72 affords less and less flow path to the port 73 and thus gradually throttles the outflow of oil through the second port. This acts as a means for braking or retarding the outstroke of the piston. The surface 72 is contoured and dimensioned so as to afford the desired amount of braking operation of the piston. Thus the piston is restrained in the event load is suddenly removed from it, the restraint being both by the operation of the characterized surface 72 during the latter part of the stroke and by the operation of the valve 64 or optionally by either method alone, both methods using the check valve 62 (FIGURE 3) or the check valve 162 in FIGURE 6.

Since the mechanism is subject to possible leakage, it is preferred to provide a drain system including a hollow piston rod 17. There is a central bore 81 in at least a portion of the piston rod, with the bore connecting by radial passages 82 with a gathering groove 83 in the piston. The bore 81 is long enough to extend past the head 18 and communicates through an outlet port 84 with the atmosphere, there being a check valve 86 to keep the port 84 closed except when leakage fluid is being discharged. Either air or oil passing the piston collects in the groove 83 and travels through the radial passages 82 into the hollow interior bore 81 and escapes from the piston rod bore through the port 84.

Any leakage along the piston rod and between the piston rod and a bearing 87 extending from the head 18 that flows past a packing 88 escapes into a drain channel 89 from which a radial conduit 91 leads to an appropriate point for discharge. For general servicing of the structure, the conduit 42 has an air bleed valve 92 at the upper end thereof and an oil drain valve 93 at the lower end thereof.

In a modified form of structure particularly shown in FIGURES 4, 5, 6 and 7, the functional arrangement is substantially as previously described, but the physical embodiment is somewhat different. In this instance, the cylinder 101 itself forms a part of the frame of the cable tensioner and at one end has a flange 102 connected to a base 103 suitable for attachment to any appropriate support and serving also as a mounting for a plurality of pulleys or sheaves 104. Extending from the cylinder 101 is a piston rod 106 carrying a cross plate 107 forming part of a sheave block 108 carrying pulleys or sheaves 109. A cable, not shown, but comparable to the cable 28, is reaved around the sheaves 104 and 109 and tends when tensioned to drive the piston 106 downwardly in the cylinder 101, the installation preferably being one in which the cylinder is upright. Air under pressure from the line 32 is brought into the cylinder through a passage 111 opening into an air chamber 112 in part bounded by a piston including a head 113 secured to the end of the piston rod 106. The piston head also partly defines an interior chamber 114 formed in the hollow piston rod. The piston head 113 is supplemented by a sleeve 116 having a characterized surface 117 and forming part of a piston assembly. A drain ring 118 surrounds the piston rod 106 between the sleeve 116 and the piston head 113. Machine screws 119 hold the head 113, the drain ring 118 and the sleeve 116 against a shoulder 121 formed on the piston rod 106. The drain ring is flanked by chevron packings 122 and 123 on opposite sides of a drain groove 124 joined by radial passages 126 to the interior chamber 114. In this fashion the chamber 112 is substantially closed and is supplied with air under relatively high pressure.

Oil for a chamber 131 above the piston is supplied from a reservoir 132 substantially surrounding the cylinder 101. The reservoir is provided with a level plug 133, with a filler plug 134, with a drain plug 136 and with an air vent 134. The function of the reservoir is to contain a body 138 of oil in its lowermost portion and to contain a volume 139 of air in its uppermost portion, the air being supplied under some pressure in the fashion shown in FIGURE 3 or alternately is maintained at atmospheric pressure through the air vent 137. The upper, diminished portion 141 of the chamber 131 is exteriorly closed by a ring 142 carrying rod wipers.

The diminished portion 141 of the chamber 131 is isolated from the atmosphere by a chevron packing 151 held in place by a spring 152 bearing upon a ring 153 surrounding the piston rod. Material at an excessive pressure can escape from the volume 141 directly into the air volume 139 of the reservoir through a passageway 154. This flow is controlled by a valve 156 regulated by a spring 157 held in position by a plug 158 having a central bore 159. Liquid can also flow from the volume 141 into the oil body 138 through an opening 160.

With this arrangement, when the piston rod 106 reciprocates within the cylinder, its outward motion is controlled by liquid flow as illustrated in FIGURE 3, the hydraulic outflow passages being carefully regulated. When the piston 106 moves inwardly of the cylinder, oil from the volume 138 of the reservoir is induced to flow into the cylinder through passages 160 and 161, flow in the latter of which is controlled by ball valves 162 or check valves designed to seat to check outflow. The operation of this structure is substantially the same as previously described. There is a relatively unrestricted, free influx of oil when the piston rod travels inwardly under the contracting force of the stress in the surrounding cable. The outflow of oil is carefully regulated or controlled to govern the outward movement of the piston and, consequently, the travel of the sheave block 108. Normal operation occurs at a regulated rate, but should there be a breakage or a loss of load, the piston 106 travels outwardly only under controlled conditions so that damage and possible personal injury cannot result.

If desired, there is provided a sensing mechanism 171 connected to the sheave block 108 by a cord 172 so that the instantaneous position of the sheave block is made effective upon a transmitting device 173 to indicate at a remote location the precise relative position of the piston within the cylinder.

What is claimed is:
1. A hydropneumatic cable tensioner comprising a base, a cylinder closed at one end and mounted on said base, a first cable sheave mounted on said base adjacent said one end of said cylinder, a piston reciprocable in said cylinder, a piston rod connected to said piston and extending from the other end of said cylinder, a head substantially closing said other end of said cylinder and passing said piston rod, a second cable sheave mounted on the extended end of said piston rod, a cable reaved around said first cable sheave and said second cable sheave and when tensioned adapted to urge said piston rod into said cylinder, means for supplying said one end of said cylinder with air under pressure tending to move said piston rod out of said cylinder at a dangerous speed if unrestrained, a substantially closed reservoir adapted to hold oil, means forming a first port in said other end of said cylinder in a position out of the traverse path of said piston, means for connecting said first port and said reservoir, a check valve in said connecting means checking flow toward said reservoir, means in said connecting means for variably limiting flow therein around said check valve to rates at which said piston rod is thereby restrained to move out of said cylinder at safe speeds, means forming a characterized surface on said piston, means forming a second port in said other end of said cylinder in a position in the traverse path of said piston, means for connecting said second port and said reservoir and interconnecting means are provided for supplying said reservoir with air under pressure from said one end of said cylinder.

2. A hydropneumatic cable tensioner as in claim 1 in which means are provided in said interconnecting means for establishing a lower air pressure in the air volume of said reservoir than in the air volume of said cylinder.

3. A hydropneumatic cable tensioner as in claim 1 in which said reservoir surrounds at least part of said cylinder.

4. A hydropneumatic cable tensioner as in claim 1 in which said piston rod is hollow and including means opening from the face of said piston to the hollow interior of said rod for receiving leakage, and including means extending from the hollow interior of said rod to the exterior thereof for releasing leakage therefrom.

References Cited by the Examiner
UNITED STATES PATENTS

| 2,588,037 | 3/1952 | Orton | 254—189 |
| 3,120,157 | 2/1964 | Mello | 91—408 |

FOREIGN PATENTS

| 12,110 | 9/1884 | Great Britain. |

EVON C. BLUNK, *Primary Examiner.*
H. C. HORNSBY, *Assistant Examiner.*